United States Patent [19]

Kendall

[11] 4,298,176

[45] Nov. 3, 1981

[54] REMOTE REFUELING STATION

[75] Inventor: John H. Kendall, Cypress, Calif.

[73] Assignee: McDonnell Douglas Corporation, Long Beach, Calif.

[21] Appl. No.: 16,368

[22] Filed: Mar. 1, 1979

[51] Int. Cl.³ .............................................. B64D 39/00
[52] U.S. Cl. ................................ 244/135 A; 358/88; 358/109
[58] Field of Search ............. 244/135 A, 161; 358/88, 358/89, 100, 108, 109

[56] References Cited

U.S. PATENT DOCUMENTS

| | | | |
|---|---|---|---|
| 2,514,828 | 7/1950 | Ayres | 358/88 X |
| 2,616,031 | 10/1952 | Nosker | 358/109 X |
| 2,663,523 | 12/1953 | Leisy | 244/135 A |
| 2,883,906 | 4/1959 | Rehorn | 358/88 X |
| 3,224,709 | 12/1965 | Blizard | 244/161 |
| 3,697,675 | 10/1972 | Beard et al. | |
| 3,757,042 | 9/1973 | Funk | |
| 3,780,220 | 12/1973 | Fugitt et al. | 358/99 |
| 3,821,466 | 6/1974 | Reese | |
| 3,910,533 | 10/1975 | Cheatham et al. | 244/161 |
| 3,916,094 | 6/1974 | Marrone | |
| 3,917,196 | 11/1975 | Pond et al. | 244/135 A X |
| 4,025,193 | 5/1977 | Pond et al. | 244/135 A X |
| 4,122,484 | 10/1978 | Tan | 358/88 X |

OTHER PUBLICATIONS

"Satrac–Space Rendezvous System", *Astronautics,* Jun. 1964, Lawrence J. Kamm.

Primary Examiner—Galen L. Barefoot
Attorney, Agent, or Firm—John P. Scholl; Walter J. Jason; Donald L. Royer

[57] ABSTRACT

A refueling system, for use in a tanker aircraft from a remote location without a direct out-the-window view of the refueling operation, having enhanced three-dimensional viewing of the refueling operation by use of multiple video cameras, polarized video monitors and cross-polarized eye glasses together with controls for movement of the boom tip in elevation and azimuth, as well as controls for extension of the boom tip.

3 Claims, 5 Drawing Figures

REMOTE REFUELING STATION

BACKGROUND OF THE INVENTION

Aerial refueling by a tanker aircraft has become an accepted method of extending the duration of the flight of the receiver aircraft such as fighters, bombers and cargo aircraft. Two types of refueling systems have been used in the past. In United States Navy aircraft, the tanker trails a refueling drogue and the receiver aircraft maneuvers to insert a probe into the drogue to receive fuel from the tanker.

In the second refueling system used by United States Air Force aircraft, the tanker aircraft has a boom which extends from the rear of the aircraft and contacts a refueling receptacle in the receiver aircraft. One of the main advantages of this second system over the first is the ability of the tanker aircraft to transfer large quantities of fuel in a short period of time. The basis for the fast refueling capacity is a large diameter refueling pipe which is enclosed in an aerodynamically-shaped refueling boom. This second system has been the accepted means of refueling Air Force planes for over 20 years.

In the boom type system the pilots of both aircraft and a boom operator are in continuous radio communication. The receiver aircraft approaches the tanker from behind and below, and it is the boom operator's job to estimate the position of the receiver aircraft and determine when the receiver aircraft is within reach of the refueling boom. Due to the need of the boom operator to have a good view of the refueling operation so he can make the precise connection between the boom and the refueling receptacle of the receiver aircraft, the refueling operator has been located in the lower aft portion of the tanker aircraft where he has a direct out-the-window view of the boom and receiver aircraft. The boom operator lies prone in the rear of the tanker aircraft viewing the refueling boom and receiver aircraft through a window while flying the refueling boom with manual, hydraulically boosted controls. Refueling operations in this prone position are very fatiguing to the boom operator and his view of the refueling operation is limited. The remote location of the boom operator's station in the lower aft portion of the aircraft, away from the flight compartment, has meant that the boom operator has not been available for other activities in the flying of the tanker aircraft. The remote location of the station also means that the boom operator requires a separate life support system which is costly and necessitates modification of the rear frame of the aircraft.

SUMMARY OF THE INVENTION

The present invention provides a means whereby the boom operator can manage the refueling operations from a position in the tanker aircraft without a direct (out-the-window) view of the refueling scene. The refueling operator may perform his functions from a location in or near the cockpit of the aircraft or from some other advantageous position in the center of the tanker aircraft. The relocation of the boom operator permits his use for other functions in the flying of the aircraft such as flight engineer, navigator or co-pilot. The relocation may also eliminate the need for a separate life support system in the aft of the tanker aircraft. With the elimination of this aft life support system and the viewing compartment, a substantial reduction in weight and a more simplified construction of the tanker aircraft are possible.

The present remote refueling system provides a means of viewing the refueling operation including providing the operator with a three-dimensional image to enhance the boom operator's depth perception so that he has the ability to make accurate estimates of distance. The system also provides for remote operation of the boom controls to make the precise connections between the tanker and receiver aircraft.

DESCRIPTION OF THE PREFERRED EMBODIMENT

Figure 1:
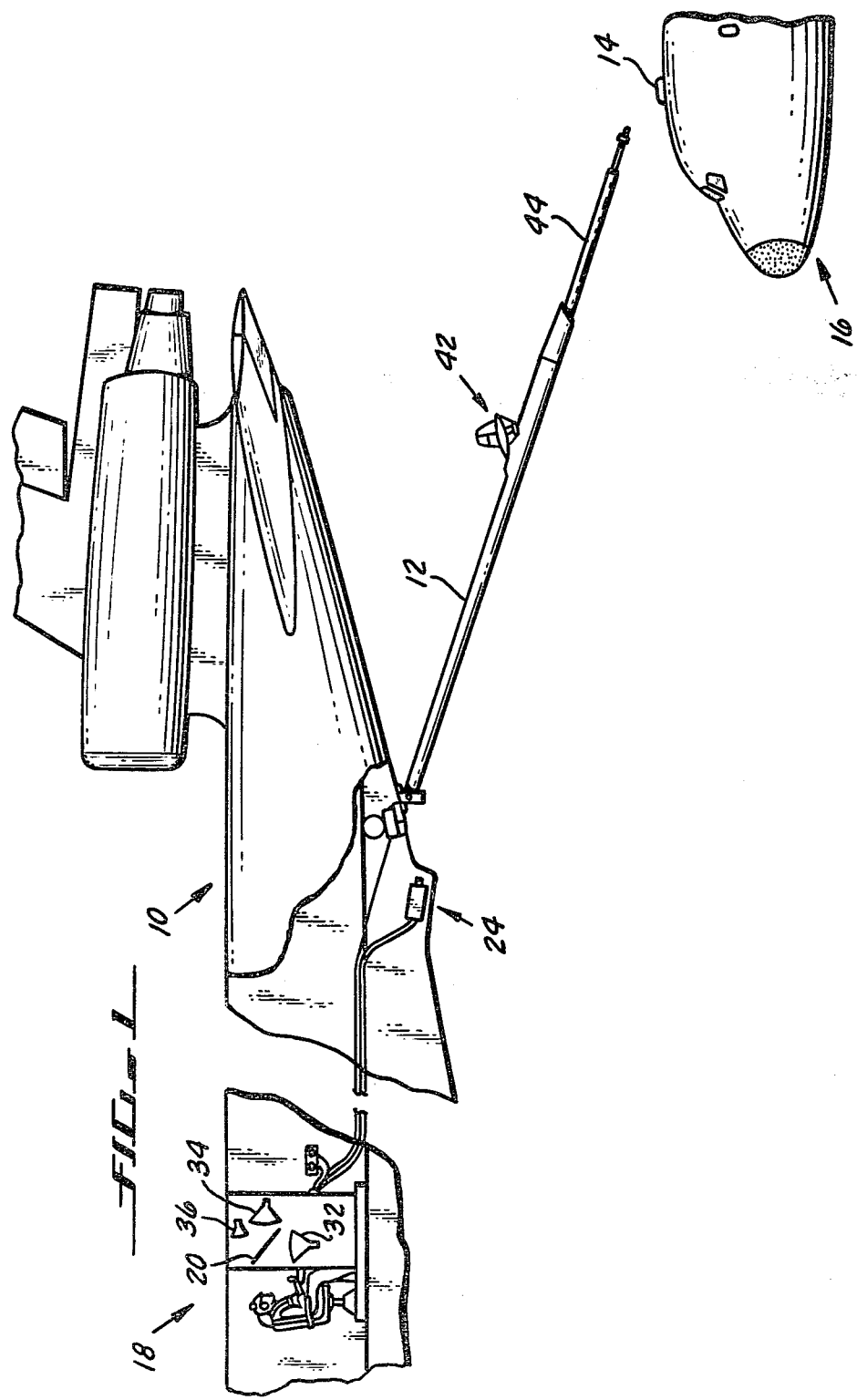
FIG. 1 is a side elevation view of a tanker aircraft with refueling boom in the process of hooking up to a receiver aircraft.

In FIG. 1, a partial view of the aft end of a DC-10 tanker aircraft 10 is depicted with boom 12 lowered to engage the refueling receptacle 14 of receiver aircraft 16.

Figure 2:
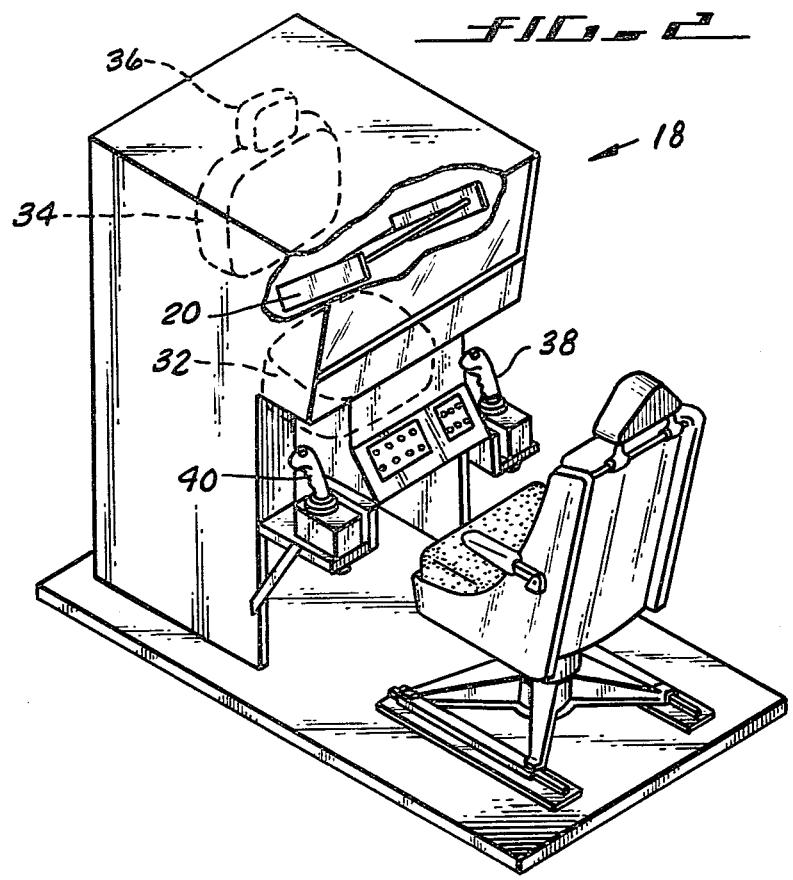
FIG. 2 is the refueling boom operator's console, including remote viewing apparatus, chair and hand controllers.

In the interior of the aircraft 10 at a location removed from the refueling boom 12 without a direct or out-the-window view of the refueling operation, the boom operator sits at his console 18 observing the refueling operation via a viewing screen 20. In FIG. 2 an enlarged oblique view of the boom operator's console 18, screen 20, chair 22 and hand controllers are shown.

Figure 3:
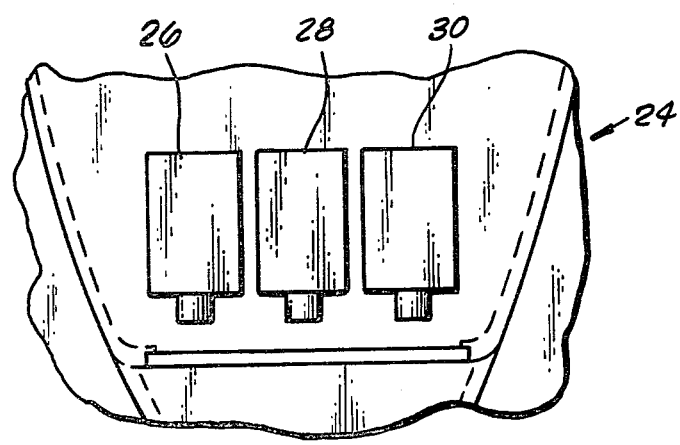
FIG. 3 is a plan view of three television cameras located in the tail of the tanker aircraft for observing the refueling operation.

FIG. 3 is a plan view of the camera station 24 showing the three aft directed television cameras 26, 28 and 30. Cameras 26 and 30 are spacially separated.

Looking aft, the right video camera 26 is electrically connected to the bottom video monitor 32. The left video camera 30 is electrically connected to the middle video monitor 34. The center video camera 28 has a wide angle lens and is electrically connected to the top video monitor 36 which is used as an acquisition monitor to pick up the receiver aircraft 16 at a distance as it approaches the tanker aircraft 10.

In the boom operator's console the viewing screen 20 combines the images from the bottom 32 and middle 34 video monitors. The screen 20 is a clear plastic sheet with a transmitting reflective coating and acts as a pellicle transmitting a portion of the output of the video monitors to the boom operator.

Figure 4:
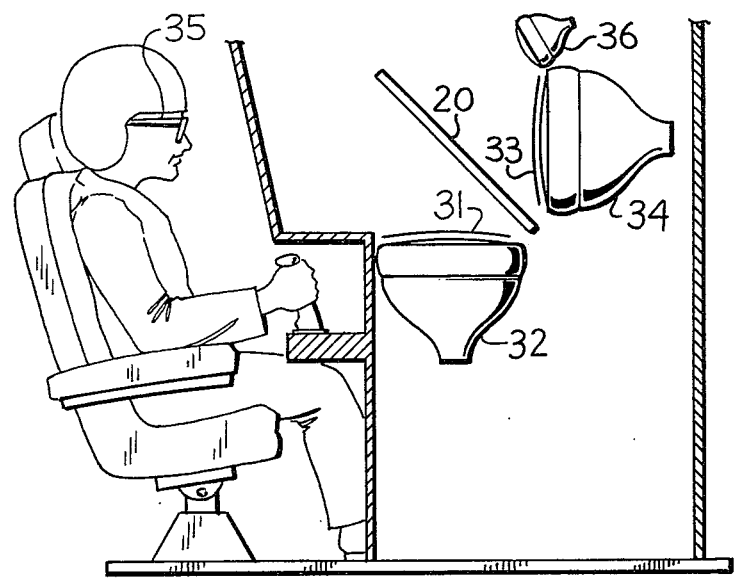
FIG. 4 is an enlargement of a portion of FIG. 1.
Figure 5:
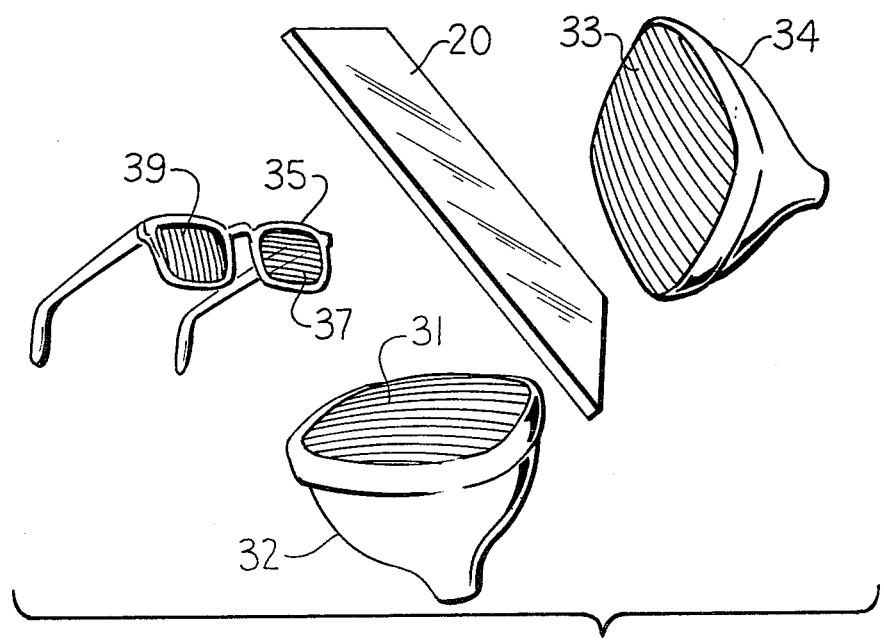
FIG. 5 is a schematic of the polarized viewing system.

Video monitors 32 and 34 are provided with filters 31 and 33 (FIG. 4) respectively which cover the screen of the monitors and polarize the image from the video monitors. The filter 31 (FIG. 5) on the bottom video monitor 32 polarizes the image in a first direction. The filter 33 (FIG. 5) on the middle video monitor polarizes the image in a second direction 90° to the output of the first video monitor. The boom operator is equipped with cross-polarized glasses 35 (FIGS. 4 and 5) so that when he looks at the combining screen 20 his right eye sees the bottom video monitor 32 and the refueling operation as seen by the right video camera 26. Similarly, the boom operator's left eye, as a result of using the polarized glasses and looking at the combining screen 20, sees the middle video monitor 34 and the refueling operation as seen by the left video camera 30. The polarization of the lense 39 of glasses 35 permits the operator's right eye to view the image on video monitor 32 thru filter 31 (FIG. 5). Similarly the polarization of lense 37 of glasses 35 permits operators left eye to view the image on video monitor 34 thru filter 33. Due to the spacial separation of the right, 26, and left video cameras 30, and the polarizing viewing system as described, the boom operator receives a three-dimensional picture of the refueling operation when looking into the combining screen. This three-dimensional image enhances the boom operator's ability to accurately estimate distances and make the precise movements of the boom necessary to connect the tanker and receiver aircraft. The positions of the video monitors for the right and left cameras 26 and 30 can be reversed so long as the boom operator's cross-polarized glasses are adjusted and upon viewing the combining screen 20 permit his right eye to see the refueling scene from the right camera 26 and his left eye to see the refueling scene from the left camera 30, thus providing a separate image for each eye.

The output of the video cameras may be intensified to provide an adequate image on the video monitor under varying light conditions inside and outside of the tanker aircraft. Extended spectrum (e.g., infrared) sensitive cameras may be used for viewing the refueling operation to provide enhanced nighttime viewing. The right and left video cameras may be adjusted for focus and direction. Further, the right or left video camera may be adjusted and with their associated video monitor used as a backup for the acquisition monitor 36.

On the boom operator's console 18, FIG. 2, are located a righthand controller 38 and a lefthand controller 40. The righthand controller 38 generates an electric command signal which interfaces with, and controls the boom control actuators. The boom control actuators, by means of conventional electric or hydraulic motors, move the flight control surfaces on the boom to make azimuth and elevation adjustments of the refueling boom.

The lefthand controller 40 generates an electric command signal which interfaces with boom telescoping mechanism and provides for extension and retraction of the telescoping portion of the boom 44. The movement of the telescoping mechanism may be by conventional electric or hydraulic motors.

The operator's console 18 contains the conventional refueling switches and instruments which are normally used in a refueling operation.

In operation, the tanker aircraft takes up a predetermined course, and the receiver aircraft approaches from the rear. The boom operator puts on headphones and microphone so that he has radio communication with pilots of the tanker and receiver aircraft. The boom operator then views the upper or acquisition monitor 36 to look for the receiver aircraft 16. Since the image on this monitor 36 is not polarized, he will be able to see the approach of the receiver aircraft 16 with both eyes regardless of whether or not he is wearing his polarized glasses. As the receiver aircraft approaches the refueling zone, the boom operator begins to scan the combining screen 20 to obtain a better three-dimensional picture of the boom 12 and receiver aircraft 16 so that he can make precise adjustment of the refueling boom 12.

When the boom operator, by viewing the combining screen 20, determines that the receiver aircraft 16 is within range of the boom 12 to make a refueling hookup, he maneuvers or "flys" the boom 12 by means of the righthand controller 38 to move the tip of the boom toward the refueling receptacle 14 of the receiver aircraft 16.

The boom operator also uses the lefthand controller 40 to activate the conventional boom extension motor to extend or retract the extensible portion of the boom 44 as necessary to "hook-up" to the refueling receptacle 14 on the receiver aircraft 16.

When the boom 12 contacts the refueling receptacle 14 and hook-up has been made, the boom operator activates conventional refueling switches to transfer the fuel from the tanker 10 to the receiver aircraft 16. Following refueling of the aircraft 16, the operator maneuvers the right, 38, and lefthand controllers 40 to disconnect the boom 12 from the receiver aircraft 16. Although the preferred location of the right and lefthand controllers is as set for the above, the functioning of the right and lefthand controllers may be reversed so that the left controller moves the boom 12 for azimuth and elevation corrections and the right controller extends and retracts the extensible portion 44 of the boom.

While certain exemplary embodiments of this invention have been described and shown in the accompanying drawings, it is to be understood that such embodiments are merely illustrative of, and not restrictive on, the broad invention and that I do not desire to be limited in my invention and to the specific constructions or arrangements shown and described, since various other obvious modifications may occur to persons having ordinary skill in the art.

What is claimed is:

1. A remote refueling station to control the transferring of fuel from a tanker aircraft to a receiver aircraft by means of a maneuverable extensible refueling boom connected to said tanker aircraft comprising:

a stereoscopic viewing system located in said tanker aircraft comprising a left video camera, a right video camera spacially separated from said left video camera, said cameras directed for observation of said refueling boom and said receiver aircraft, a first video monitor, electrically connected to said left video camera, a first filter to polarize the output image of said first video monitor in a first direction, a second video monitor electrically connected to a said second video camera, a second filter to polarize the output of said second video monitor image in a second direction 90° to the direction of the polarization of said first video monitor, a screen to positionally combine and transmit the images from said first video monitor and said second video monitor, cross-polarized eye glasses to separate the image of said first video monitor from the image of said second video monitor on said screen whereby said boom operator receives the picture from said right video camera in his right eye and from said left video camera in his left eye;

first controller means generating an electric command signal which maneuvers the boom in azimuth and elevation;

second controller means generating an electrical command signal which activates the extensible portion of the boom; and a third video camera located in the rear of the tanker aircraft and directed to the rear to obtain a view of the approach of the receiver aircraft, and third video monitor electrically connected to said third video camera for viewing the output of the third video camera.

2. The remote refueling system of claim 1 wherein the left video camera and right video camera are located in the rear of the tanker aircraft and are positioned to view the refueling boom throughout its azimuth and elevation excursions.

3. The remote refueling system as provided in claim 2 wherein the right and left video cameras are sensitive to infrared and transmit infrared images to the right and left video monitors.

* * * * *